2,856,436

PROCESS FOR THE WORKING UP OF MIXTURES CONSISTING OF VINYL ETHERS OF ALIPHATIC OR CYCLOALIPHATIC ALCOHOLS

Gerhard Faerber, Moers, Germany, assignor to Deutsche Solvay-Werke G. m. b. H., Solingen-Ohligs, Germany No Drawing. Application May 13, 1955
Serial No. 508,309

Claims priority, application Germany September 20, 1954

3 Claims. (Cl. 260—616)

The invention relates to a process for the working up of mixtures consisting of vinyl ethers of aliphatic or cycloaliphatic alcohols containing four or more carbon atoms and these alcohols themselves, which mixtures result from the treatment of these alcohols with acetylene in presence of alkaline catalysts. The mixtures obtained from the latter reaction cannot be split up into their constituents by fractionation, since the vinyl ethers and the alcohols from which they were formed form azeotropic mixtures with one another. So far as mixtures of lower alcohols containing up to 3 carbon atoms and their vinyl ethers are concerned, however, these mixtures can be separated by extraction of the alcoholic fraction or by conversion of the alcoholic fraction into the alcoholate and subsequent distillation; on the other hand, the separation of mixtures of higher alcohols and their vinyl ethers is considerably more difficult. Alcohols containing up to 3 carbon atoms can also easily be separated from their vinyl ethers by washing with water.

The separation of the alcohols with 4 or more carbon atoms from their vinyl ethers is rendered difficult on account of the small solubility of the alcohols in water. On account of the slight solubility of caustic potash in the higher alcohols, the same applies with regard to the formation of the alkali alcoholates.

In order to remove the alcohol from a vinyl ether-alcohol mixture it has already been proposed to mix and to heat the azeotropic mixture with 25–100%, preferably 33–50%, of solid alkali hydroxide. A mixture of alcohol, vinyl ether and water then slowly distils off over a column. The water is separated and the organic part returned to the flask. This process is long drawn-out and leads to increased formation of residue, since the strongly alkaline mixtures have to be heated over 36 hours. According to another proposal, the mixtures of the alcohols and their vinyl ethers are extracted with an at least 20% aqueous solution of an alkali salt of phenol, cresol or xylenol, by which the alcohol is caused to go into solution. In order to remove the alcohol fraction from the mixture, it has further been proposed to treat the mixtures with aqueous solutions of the alkali metal or alkaline earth metal salts of aliphatic or aromatic acids. Only unsatisfactory results can be achieved by means of the known processes, insofar as the separation of vinyl ethers and the alcohols corresponding therewith having 6 carbon atoms or more is concerned.

It has been found that vinyl ethers can be separated in a simple manner from their corresponding aliphatic or cycloaliphatic alcohols having 4 or more carbon atoms by treating the preheated mixture in known way with a solution of an alkali metal alcoholate of a lower, low-boiling alcohol, and then distilling off from the mixture the lower alcohol formed in the reaction and finally the vinyl ether.

According to the invention, the alkali metal alcoholate may be suitably employed in an excess of up to 20% of the quantity theoretically necessary. The use of a solution of sodium methylate in methanol is particularly advantageous. By distilling off methanol, the reaction, the net result of which is a transfer of alkali metal from one alkoxy radical to the other takes place in the shortest possible time and practically quantittatively, owing to displacement of the equilibrium. The vinyl ether can then be separated by simple distillation of the mixture remaining and is practically free from alcohol.

The process of the invention is applicable, for example, to the separation of the following vinyl ethers from their alcohols; isoamyl vinyl ether, ethylbutyl vinyl ether, hexyl vinyl ether, ethylhexyl vinyl ether, octyl vinyl ether, 1-methyl-heptyl vinyl ether, dodecyl vinyl ether, cetyl vinyl ether, cyclohexyl vinyl ether.

Examples

When not otherwise indicated, the parts mentioned are parts by weight.

(1) 1587 parts of the azeotropic mixture of n-octyl vinyl ether and n-octanol (vinyl ether content 90.4%) are heated to 150° C. in a 3-litre flask provided with a stirrer, inlet tube, Claisen attachment with distilling apparatus and thermometer. A solution of 40 parts of sodium and 300 parts of methanol is, while stirring, dropped in through the inlet tube in the course of an hour. Methanol distils off continuously. After the addition is completed the temperature is raised to 180° C. in the course of a further two hours, until all the methanol has distilled over. After cooling the mixture is distilled in vacuum. 1345 parts of octanol vinyl ether with a purity of over 99% distil over at 88°/15 mm. The yield amounts to 93% of the vinyl ether which was present in the initial solution, $n_D^{20} 1.4281$. n-Octanol is found in the residue combined as alcoholate, as well as excess sodium alcoholate. n-Octanol can easily be recovered by dissolving the residue in water, neutralising and separating the layers, or by extraction.

(2) In the apparatus specified in Example 1, 1809 parts of the azeotropic mixture of 2-ethyl-n-hexyl vinyl ether and 2-ethyl-n-hexanol (vinyl ether content 90%) are heated to 150° C. and a solution of 46 parts of sodium in 400 parts of methanol is slowly added through the inlet tube while stirring. The excess methanol thereby distils off. Then with further stirring the temperature is slowly increased up to the boiling point of the mixture. When no more methanol distils over, the mixture is allowed to cool and the residue is distilled in vacuum. 1430 parts of 2-ethyl-n-hexyl vinyl ether with a boiling point of 67°/10 mm. and a purity of over 99% are obtained. $n_D^{20} 1.4282$. The yield amounts to 88% of the vinyl ether which was present in the initial solution. The separated 2-ethyl-n-hexyl alcohol can be recovered as indicated in Example 1.

(3) 1165 parts of a ternary mixture consisting of 72.6% of 1-methyl-n-heptyl vinyl ether, 5% of methyl-n-hexylketone and 22.4% of 1-methyl-n-hexyl carbinol are heated to 155° C. in a 2-litre round-bottomed flask, which is provided with stirrer, thermometer, inlet tube and a short Vigreux column with a distilling apparatus and while stirring, a solution of 56 parts of sodium in 500 parts of methanol is introduced through the inlet tube. The temperature is then, with further stirring, increased within about two hours up to the boiling point of the mixture. Methanol thereby distils over completely. After cooling, the mixture is distilled in vacuum, during which 825 parts of a solution which contains practically no alcohol passes over between 73 and 74°/12 mm. Methyl-n-hexylketone can be separated either before beginning the experiment or else from the final solution according to known methods, for example by conversion into the oxime. The yield of pure vinyl ether amounts to 92% of the vinyl ether present in the initial solution.

(4) 22 parts of the azeotropic mixture of cyclohexyl vinyl ether and cyclohexanol (vinyl ether content 85%) are mixed with a solution of 0.9 part of sodium in 12 parts of methanol in a small 50 cc. flask, and slowly heated to boiling. Methanol distils off via an attached distillation apparatus. The flask is heated as long as methanol passes over, which requires 1 to 2 hours. The contents of the flask are then subjected to a distillation in vacuum. 17 parts of cyclohexyl vinyl ether of 98% purity are obtained—boiling point 45.5°/14 mm.; $n_D^{20}$ 1.4533. On renewed treatment of this vinyl ether with a sodium methylate solution under the specified conditions, practically alcohol-free cyclohexyl vinyl ether is obtained.

What I claim is:

1. Process for the separation of the components of mixtures of vinyl ethers of alcohols and the corresponding alcohols themselves, the alcohols being selected from a group consisting of aliphatic alcohols having four to eight carbon atoms, cyclohexanol, and mixtures thereof, comprising heating the vinyl ether-alcohol mixture, reacting same with an alkali metal alcoholate, the alcohol of the latter being a low-boiling alcohol containing no more than three carbon atoms, and distilling off first the low-boiling alcohol formed and then the vinyl ether.

2. The process according to claim 1, wherein the alkali metal alcoholate is used in an excess up to 20% of the quantity corresponding to the quantity of the alcohol to be separated.

3. In the process according to claim 1, wherein a solution of sodium methylate in methanol is used as the alkali metal alcoholate.

References Cited in the file of this patent

UNITED STATES PATENTS

| | | |
|---|---|---|
| 2,069,404 | Cunningham | Feb. 2, 1937 |
| 2,546,431 | Collardeau et al. | Mar. 27, 1951 |
| 2,641,616 | Ellinger | June 9, 1953 |
| 2,683,750 | Ellinger | July 13, 1954 |